March 17, 1931.  J. S. PIXLEY  1,797,178
SIGNAL LANTERN
Filed Oct. 5, 1928   2 Sheets-Sheet 1

INVENTOR
Judson S. Pixley
BY
ATTORNEY

March 17, 1931.  J. S. PIXLEY  1,797,178
SIGNAL LANTERN
Filed Oct. 5, 1928   2 Sheets-Sheet 2
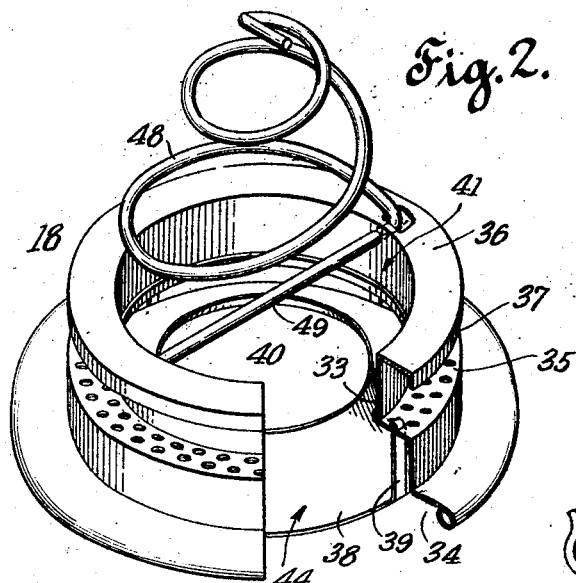
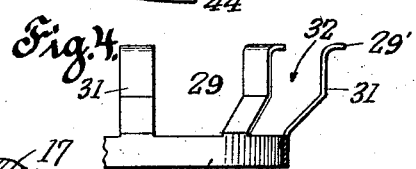
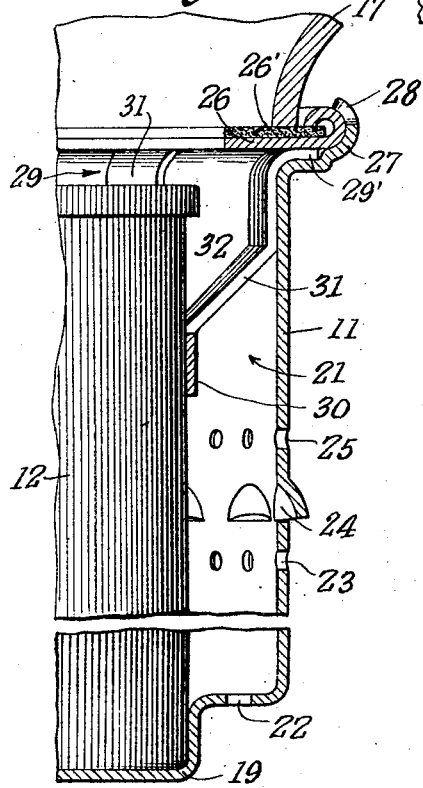
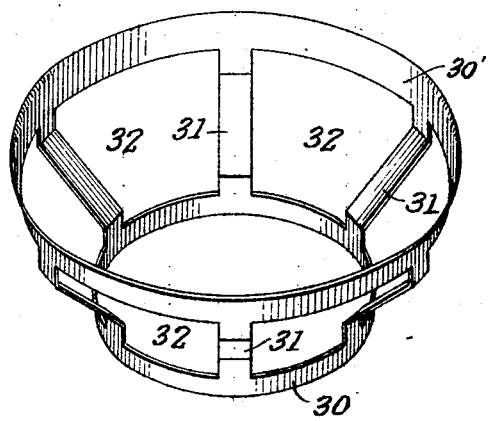
INVENTOR
Judson S. Pixley
BY
ATTORNEY Patented Mar. 17, 1931

1,797,178

UNITED STATES PATENT OFFICE

JUDSON S. PIXLEY, OF NEW YORK, N. Y., ASSIGNOR TO ARMSPEAR MANUFACTURING COMPANY, OF NEW YORK, N. Y., A CORPORATION OF NEW YORK

SIGNAL LANTERN

Application filed October 5, 1928. Serial No. 310,525.

My invention relates particularly to oil lanterns and its main object is to provide a simple and reliable construction suitable for burning a fluid such as is commonly termed kerosene. I particularly sought to provide a construction of minimum weight and expense of manufacture suitable for railroad signalling.

In its preferred form, the lantern consists of a frame having a base or receptacle at the bottom adapted to receive a removable oil pot or funnel and having a hinged top member together with a removable globe. The base and the top are provided with inlet and outlet passages so arranged and proportioned as to insure a steady flame during all of the various signalling operations or movements to which the lantern is subjected.

Fig. 2 is a perspective view of the upper globe holder, part of it being broken away to show the interior construction.

Fig. 3 is an enlarged vertical sectional view showing details of the air passages in the base.

Fig. 4 is a side view of a fragment of one form of the spacing spider to position the pot in the base.

Fig. 5 is a perspective view of a modified form of spider.

Fig. 6 is a horizontal sectional view of a fragment of the spider showing another modification.

Figure 1:
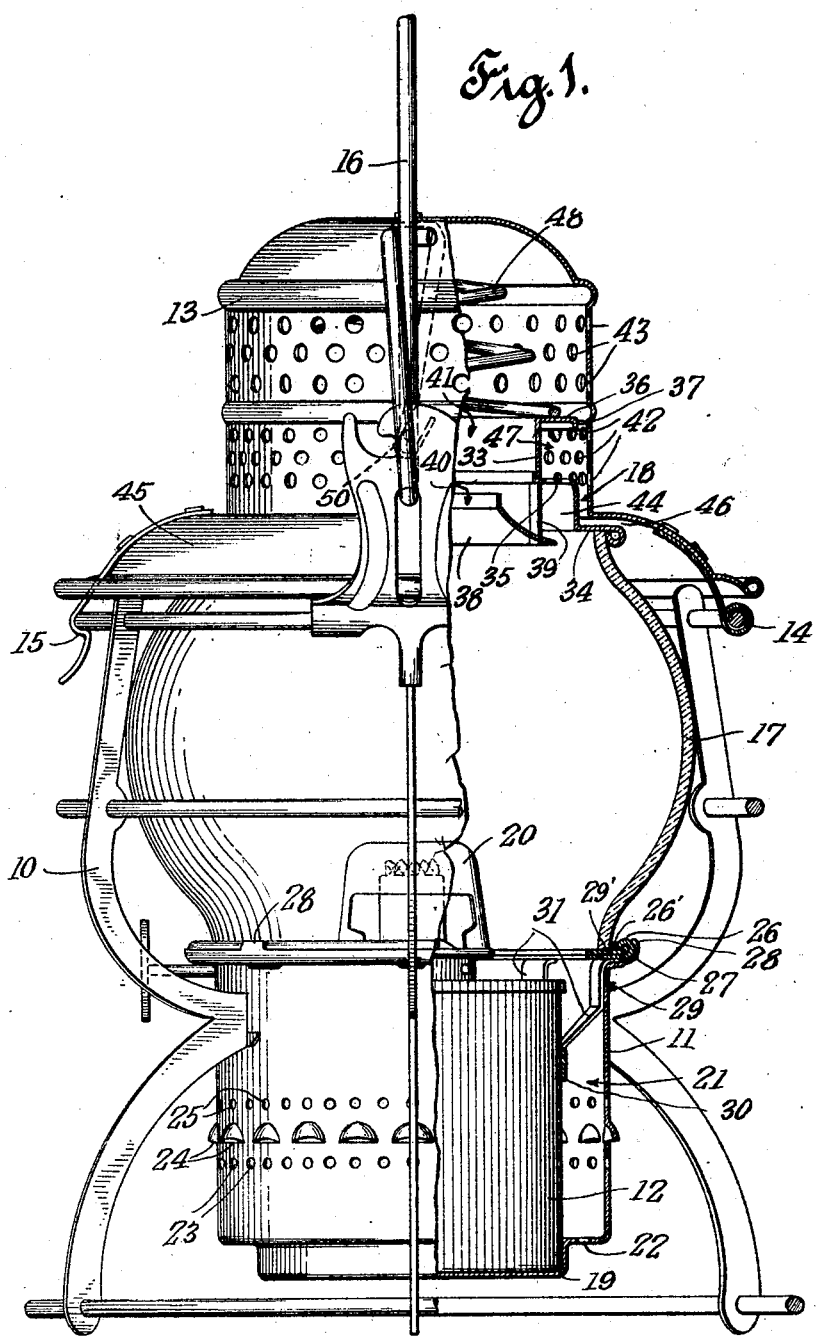
Fig. 1 is a side view and partial vertical section illustrating a lantern embodying my improvements.

The frame 10 may be of any suitable construction and supports the base 11 which serves as a receptacle for the pot or oil font 12. The top or dome member 13 may be hinged to the frame at 14 and may be provided with a spring catch 15. A handle or bail 16 of any suitable type is usually provided. The globe 17 will usually be of glass and is preferably substantially spherical in form and supported between the base receptacle and the upper holder 18.

The pot is preferably supported in the socket 19 at the bottom and the parts are so proportioned that the burner 20 provides a flame substantially at the center of the globe.

The oil pot being smaller in diameter than the receptacle, an air space 21 is provided which has air inlets 22 at the bottom and 23, 24, and 25 at the sides and communicates directly with the main chamber within the globe 17. Preferably the side openings are arranged in a plurality of rows and one or more of these rows such as 24 is formed by slitting or cutting the stock along circumferential lines and pressing the metal outwardly or inwardly in the form of louvers. The shape of these louvers may be such as to catch the air as the lantern is moved and force air through the space 21 to the burner at the same time that air is admitted through the bottom openings 22. The openings 23 and 25 permit air to enter when the lantern is swung or moved sideways. Other forms of louvers may be provided if desired to accomplish other effects.

The lower edge of the globe is supported on a seat 26 which is secured in place by an outwardly turned flange 27 and lug 28. A gasket 26' for instance of asbestos may be provided to afford a yielding seat for the lower edge of the globe.

To guide and steady the pot 12 I provide a metal spider 29 which is suitably supported in the base. In the form shown it has lugs 29' flaring outwardly and supported in pockets in the upper edge of the receptacle 11 beneath the globe seat. This spider has a ring 30 which snugly fits the sides of the oil pot, and is supported by the fingers 31 which are preferably partly inclined and arranged so as to supply the necessary supporting strength with a minimum obstruction to the passage of air through the spaces 32 between them. The drawing somewhat exaggerates the thickness of metal of the spider. The ring of the spider may be corrugated as at 30' in Fig. 5 if desired so as to stiffen the same and allow the air to pass between the ring and the oil pot. The fingers 31 may be connected by an upper ring 30' the edge of which may flare outwardly and be supported by the inner edge of the body 11 beneath the globe seat.

The upper globe holder 18 may be made up of a number of parts suitably secured together and including a central tubular flue 33 and the outwardly flaring globe seat 34 connected by a perforated wall 35 which is preferably horizontal and arranged directly above the air passage 21 at the base. The upper end of the globe holder is provided with an outwardly extending deflecting flange 36 which preferably terminates in a downwardly turned rim 37 located spaced apart from but near the inner wall of the dome 13.

A wind breaker 38 is also preferably provided and suspended from the holder by hanger strips 39. This wind breaker is preferably of bell shape or funnel form with its upper end approximately on the level of the wall 35 and provided with a central opening 40 discharging into the lower part of the main flue 41 of the tube 33. The side walls of the dome are provided with a number of rows of openings such as 42 and 43 serving as outlets for the products of combustion under normal circumstances and permitting inward flow of air under certain circumstances. Between the wind breaker 38 and the outer wall of the globe holder 18 is a passage 44. The reflector 45 extends downwardly and outwardly from the upper part of the dome and a passage 46 is left between this reflector and the globe holder 18. Around the tubular member 33 and the side wall of the top or dome 13 is an air space 47 whose cross section is approximately equal to the cross section of the air space 21 in the base receptacle and which communicates with the globe chamber through the perforated wall 35.

The relative arrangement and proportions of the air passage substantially as herein shown and described I found are quite important to the successful operation of the lantern under the extremely varying conditions of use. A spring 48 may be interposed between the globe holder and the top of the dome to yieldingly hold the globe in place. The cross bar 49 which is the lower end of this spring serves as a convenient means for securing the globe holder to the hook 50 in the dome.

I claim:

1. A lantern including a base forming a receptacle having pot holding means with a horizontally disposed flange surrounding it and having air passages, an oil pot detachably mounted in said receptacle and of smaller diameter than the base, said base having a number of rows of air openings in its side wall some of said openings having individual inclined louvers opening downwardly and other openings being unobstructed laterally, a globe seat at the upper edge of the base extending outwardly over the upper edge of the base, and a spacing spider supported at the upper edge of the base and having a ring for positioning the oil pot and narrow connecting arms supporting said ring without material obstruction of the air space between the base and the pot.

2. In a lantern, a dome closed at the top and having a number of rows of holes in the side wall and terminating in an outwardly and downwardly flaring reflector flange, a globe holder mounted in said dome and having a central flue tube with an outwardly extending perforated flange terminating in a downturned rim at its outer edge, said holder having an outwardly extending flange at the lower end of said tube, and an upper globe seat at the lower edge of said holder, and a wind breaker of funnel form supported by said tube, the upper end of said breaker being located at the lower end of the tube and of smaller diameter than the tube, the lower end of the breaker being of less diameter than the upper globe seat, said dome and holder being so proportioned as to leave an air passage between the upper globe seat and the adjacent walls of the dome communicating with an air space around the flue tube, said air space also communicating through said perforated flange directly with the space inside of the holder around said wind breaker.

3. A lantern comprising a frame, a base at the bottom of the frame having air inlets around its sides, an oil pot detachably supported within said base with an air space between the pot and the base substantially unobstructed at its upper end to permit a substantial flow of air parallel to the axis of the lantern, a lower globe seat extending outwardly at the upper edge of the base, a dome at the top of the frame having air outlets around its sides and a reflector at its lower edge, a globe holder mounted in said dome and having a central flue and a deflector flange at the top and an upper globe seat flange at the lower end of the holder and having a perforated wall between said flanges, a globe supported in the upper and lower seats, some of the air outlets in said dome being arranged above said deflector flange and some of them being below said deflector flange, said perforated wall constituting the sole obstruction between the globe interior and the space around said tube to permit flow of air parallel to the axis of the lantern, the horizontal cross section of the air space around the oil pot being approximately equal to the cross section of the space between the dome wall and the flue tube.

4. In a lantern, a dome closed at the top and having a number of holes in the side wall and terminating in an outwardly and downwardly flaring reflector flange, a globe holder mounted in said dome and having a central flue tube with an outwardly extending flange at its outer edge, said holder having an outwardly extending perforated wall and an upper globe seat at the lower edge of said holder, said dome and holder being so proportioned as to leave an air passage between the upper globe seat and the adjacent walls of the dome communicating with an air space around the flue tube, said air space also communicating through said perforated wall directly with the space inside of the holder.

5. In a lantern, a dome closed at the top and having a number of rows of holes in the side wall and terminating in an outwardly and downwardly flaring reflector flange, a globe holder mounted in said dome and having a central flue tube with an outwardly extending flange, said holder having a perforated flange at the lower end of said tube, and an upper globe seat at the lower edge of said holder above the outer edge of the reflector, and a wind breaker, the upper end of said breaker being located near the lower end of the tube and of smaller diameter than the tube, the lower end of the breaker being of less diameter than the upper globe seat, said dome and holder being so proportioned as to leave an air passage between the upper globe seat and the adjacent walls of the dome communicating with an air space around the flue tube, said air space also communicating through said perforated flange directly with the space inside of the holder around said wind breaker.

6. A lantern comprising a frame, a base at the bottom of the frame having air inlets around its sides, an oil pot detachably supported within said base with an air space between the pot and the base, a lower globe seat extending outwardly at the upper edge of the bass, a dome at the top of the frame having air outlets around its sides and a reflector at its lower edge, a globe holder mounted in said dome having a central flue with an upper globe seat flange at its lower edge of approximately the same size as the lower globe seat and a deflector flange at the upper end of the holder and having a perforated wall between said flanges, a globe supported in the upper and lower seats, some of the air outlets in said dome being arranged above said deflector flange and some of them being below said flange, said perforated wall constituting the sole obstruction between the globe interior and the space around said tube to leave an air passage parallel to the axis of the lantern.

JUDSON S. PIXLEY.